United States Patent
Reibman et al.

(10) Patent No.: US 10,298,987 B2
(45) Date of Patent: May 21, 2019

(54) DELIVERY OF MEDIA CONTENT TO A USER DEVICE AT A PARTICULAR QUALITY BASED ON A PERSONAL QUALITY PROFILE

(71) Applicant: AT&T Intellectual Property I, L.P., Atlanta, GA (US)

(72) Inventors: Amy Ruth Reibman, Chatham, NJ (US); Zhu Liu, Marlboro, NJ (US); Lee Begeja, Gillete, NJ (US); Bernard S. Renger, New Providence, NJ (US); David Crawford Gibbon, Lincroft, NJ (US); Behzad Shahraray, Holmdel, NJ (US); Raghuraman Gopalan, Freehold, NJ (US); Eric Zavesky, Austin, TX (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 0 days.

(21) Appl. No.: 14/273,747

(22) Filed: May 9, 2014

(65) Prior Publication Data
US 2015/0326903 A1    Nov. 12, 2015

(51) Int. Cl.
*H04N 21/2343* (2011.01)
*H04N 21/2662* (2011.01)
(Continued)

(52) U.S. Cl.
CPC ..... *H04N 21/2668* (2013.01); *H04L 65/4084* (2013.01); *H04L 65/4092* (2013.01);
(Continued)

(58) Field of Classification Search
CPC ......... H04N 21/44222; H04N 21/4755; H04N 21/23439; H04N 21/2662; H04N 21/4621;
(Continued)

(56) References Cited

U.S. PATENT DOCUMENTS

| 5,739,809 A | 4/1998 | McLaughlin et al. |
| 6,530,083 B1 | 3/2003 | Liebenow |

(Continued)

FOREIGN PATENT DOCUMENTS

| WO | 0062533 A1 | 10/2000 |
| WO | 2013180902 A1 | 12/2013 |

OTHER PUBLICATIONS

"Spark VideoPlayer and VideoDisplay Controls", Adobe Flex 4.6, Retrieved from <<http://help.adobe.com/en_US/flex/using/WSc78f87379113c38b-669905c51221a3b97af-8000.html#WSc78f87379113c38b-669905c51221a3b97af-7ffd>>, Retrieved on Feb. 19, 2014, Adobe, pp. 1-5.

(Continued)

*Primary Examiner* — Pankaj Kumar
*Assistant Examiner* — Alazar Tilahun
(74) *Attorney, Agent, or Firm* — Toler Law Group, PC

(57) ABSTRACT

A method includes receiving, at a server computing device, a request to stream media content to a user device. The request is associated with data identifying a personal quality profile. The method includes retrieving, via the server computing device, the personal quality profile associated with the data. The personal quality profile indicates media quality preferences. The method includes determining, via a processor of the server computing device, a version of the media content to send to the user device based on the media quality preferences of the personal quality profile and based on a delivery bit rate. The method also includes sending the version from the server computing device to the user device in response to the request.

20 Claims, 5 Drawing Sheets

(51) Int. Cl.
*H04N 21/258* (2011.01)
*H04N 21/233* (2011.01)
*H04N 21/2668* (2011.01)
*H04L 29/08* (2006.01)
*H04L 29/06* (2006.01)
*H04W 28/24* (2009.01)

(52) U.S. Cl.
CPC ............ H04L 65/602 (2013.01); H04L 67/04 (2013.01); H04L 67/306 (2013.01); H04N 21/233 (2013.01); H04N 21/234372 (2013.01); H04N 21/25891 (2013.01); H04N 21/2662 (2013.01); *H04N 21/234309* (2013.01); *H04W 28/24* (2013.01)

(58) Field of Classification Search
CPC .... H04N 13/026; H04N 19/59; H04N 19/597; H04N 13/0022; H04N 13/0055; H04N 21/234372; H04N 21/234381; H04N 21/234309; H04N 13/139; H04N 13/178; H04N 13/194; H04N 13/261; H04N 13/356; H04N 13/398; H04N 21/2668; H04N 21/233; H04N 21/25891; H04N 21/234391; H04L 65/4092; H04L 65/4084; H04L 65/602; H04L 67/04; H04L 67/306; H04W 28/24
See application file for complete search history.

(56) References Cited

U.S. PATENT DOCUMENTS

| | | | |
|---|---|---|---|
| 6,985,524 B1* | 1/2006 | Borchers | ................... 375/240 |
| 7,134,091 B2 | 11/2006 | Dresevic et al. | |
| 8,239,906 B2 | 8/2012 | Kim et al. | |
| 8,345,338 B2 | 1/2013 | Jeong et al. | |
| 8,401,087 B2 | 3/2013 | Sullivan et al. | |
| 8,525,752 B2 | 9/2013 | Pinzauti et al. | |
| 8,526,728 B2 | 9/2013 | Kang et al. | |
| 2006/0025149 A1 | 2/2006 | Karaoguz et al. | |
| 2008/0066138 A1* | 3/2008 | Bishop | ............... G06F 17/289 725/137 |
| 2008/0077954 A1* | 3/2008 | Cohen | ............... G11B 27/034 725/32 |
| 2008/0153537 A1 | 6/2008 | Khawand et al. | |
| 2009/0063699 A1* | 3/2009 | Chapweske | ........ H04N 7/17318 709/233 |
| 2010/0027765 A1* | 2/2010 | Schultz et al. | ................... 379/52 |
| 2010/0037267 A1* | 2/2010 | Bennett | ............... H04N 7/165 725/56 |
| 2011/0075676 A1* | 3/2011 | Gopalakrishnan et al. | .. 370/401 |
| 2011/0095875 A1 | 4/2011 | Thyssen et al. | |
| 2011/0102544 A1* | 5/2011 | Kim | ............... H04N 21/25858 348/43 |
| 2012/0057078 A1 | 3/2012 | Fincham | |
| 2013/0010010 A1 | 1/2013 | Holub | |
| 2013/0055326 A1 | 2/2013 | Lu et al. | |
| 2013/0120662 A1* | 5/2013 | Houdaille | ............... H04N 5/268 348/705 |
| 2013/0166580 A1 | 6/2013 | Maharajh et al. | |
| 2013/0169929 A1 | 7/2013 | Fateh | |
| 2013/0339869 A1 | 12/2013 | Stinson, III | |
| 2013/0343721 A1* | 12/2013 | Abecassis | ............... G11B 27/11 386/241 |
| 2014/0046955 A1 | 2/2014 | Dollard | |
| 2014/0173674 A1* | 6/2014 | Wolman | ............... H04N 21/25 725/116 |
| 2015/0279022 A1* | 10/2015 | Shuster | ............... H04N 13/0292 345/427 |

OTHER PUBLICATIONS

Periera, "A Triple User Characterization Model for Video Adaptation and Quality of Experience Evaluation", 2005 IEEE 7th Workshop on Multimedia Signal Processing, Oct. 2005, IEEE, Piscataway, NJ, pp. 1-4.

Winkler, "Issues in Vision Modeling for Perceptual Video Quality Assessment", Signal Processing, 1999, Issue 78, No. 2, Elsevier, Inc., pp. 231-252.

International Search Report and Written Opinion, International Application No. PCT/US2015/026672 dated Jul. 1, 2015, 9 pages.

* cited by examiner

DELIVERY OF MEDIA CONTENT TO A USER DEVICE AT A PARTICULAR QUALITY BASED ON A PERSONAL QUALITY PROFILE

FIELD OF THE DISCLOSURE

The present disclosure is generally related to delivery of media content to a user device at a particular quality based on a personal quality profile.

BACKGROUND

Media content delivered to a user device may be tailored to the user device (e.g., a high definition television, a standard definition television, a tablet computer, a computer monitor, a mobile communication device, etc.). For example, a spatial resolution and display ratio of particular media content provided to a first device associated with a person (e.g., a high definition television coupled to a set-top box device) may be different than a spatial resolution and display ratio of the particular media content when provided to a second device associated with the person (e.g., a mobile communication device). A viewer may be able to choose a particular spatial resolution of media content, but the viewer may not be able to choose other aspects of the media content that influence quality of the media content as perceived by the viewer.

DETAILED DESCRIPTION

Figure 1:
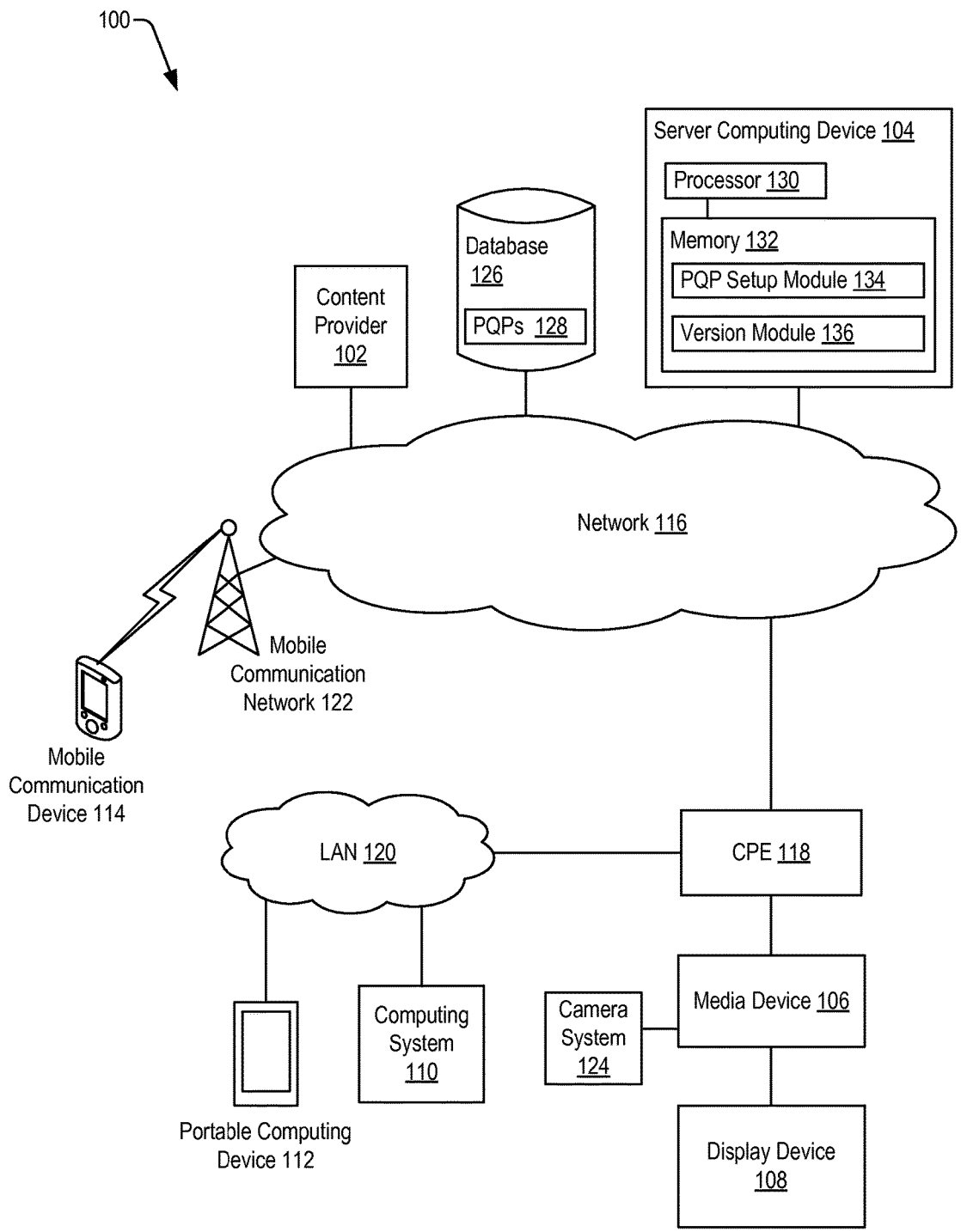
FIG. 1 is a block diagram of an embodiment of a system to deliver media content to a user device at a particular quality based on a personal quality profile.

Different viewers of media content may have different preferences for video quality and audio quality of delivered media content. The preferences may be based on viewer personalities, physiological capabilities for viewing media content, physiological capabilities for hearing media content, or combinations thereof For example, one viewer capable of seeing sharp detail may prefer to receive media content that is not at a high resolution while another viewer who does not have an ability to see sharp detail may prefer to receive media content at a high resolution. As another example, one viewer may prefer to see media content with a display ratio of 16:9 while another viewer may prefer to see media content with a 4:3 display ratio. Additionally, a particular viewer may have one or more visual deficits (e.g., color blindness, limited depth perception, astigmatism, one or more other ocular conditions, or combinations thereof), one or more hearing deficits, or combinations thereof, that may influence quality preferences of the particular viewer.

To accommodate quality preferences for a viewer or a group of viewers (e.g., a family), a personalized quality profile (PQP) may be set up for the viewer or the group of viewers. The PQP may be used to deliver customized media content to improve a viewing experience, to reduce video bandwidth, or both. A bitstream delivered to a user device may be selected, modified, or both, based on the PQP. Further, the bitstream received by the user device may be modified by the user device, settings for a display device associated with the user device may be adjusted, or both, based on the PQP. The PQP may be shared across two or more user devices associated with the viewer or group of viewers.

A server computing device that provides media content to a user device may use the PQP to determine a spatial resolution and a temporal resolution of media content to be provided to the user device based on content of the PQP. The server computing device may also determine whether to change coloration, a display ratio, or other aspects of the media content based on the content of the PQP. In other embodiments, the server computer device, customer premises equipment, the user device, or combinations thereof, may use the PQP to send requested media content to a display device, where the requested media content is at a particular quality based upon preferences defined in the PQP.

The PQP may be generated through a question and answer session conducted via a user device in combination with other information gathered during the session (e.g., type of the user device, ambient lighting conditions during the session, location of the viewer relative to a sound system or display device, etc.). The other information may be gathered by the user device via one or more cameras coupled to the user device. The question and answer session may include information gathering questions and a visual portion presented to a user interface of the user device. The information gathering questions may be inquiries that seek information about the viewer or group of viewers (e.g., "Which, if any of the conditions in the following list do you have?" with a list of selectable conditions (e.g., different type of colorblindness, stereopsis deficit, etc.), "Are you wearing contacts or glasses?", etc.) and responses from at least one viewer.

The visual portion may query a viewer about a series of displayed media content items or images. A particular query may pertain to a single media content item or image or may pertain to a pair of media content items or a pair of images. Responses to the information gathering questions may influence what is displayed during the visual portion of the question and answer session. Based on responses to the information gathering questions, based on choices made during the visual portion, based on other information gathered during the session, or based on combinations thereof, the PQP may be generated.

One or more PQPs may be associated with a viewer. For example, a particular viewer may set up a first PQP with a first name for when the viewer is wearing contact lenses, the particular viewer may set up a second PQP with a second name for when the particular viewer is wearing glasses, and the particular viewer may set up a third PQP with a third name for when the particular viewer is with one or more family members. The viewer may designate a particular PQP as a default for a particular user device of the user devices 106-114 associated with the viewer by accessing settings for the particular user device and associating a name of the particular PQP with the particular user device. Additionally, the viewer may be able to use a different PQP than the default when requesting media content or during presentation of the media content.

After the PQP is generated, the PQP may be modified. A viewer associated with the PQP may modify the PQP via another question and answer session. Alternately, the user may change one or more quality parameters by entering one or more statements (e.g., "The picture is not in focus", "It should be less jumpy", etc.) or by adjusting one or more visual indicators associated with various quality parameters (adjusting a numeric value associated with a quality parameter, changing a position of a slide of a scale associated with a quality parameter, etc.).

In some embodiments, the PQP may be automatically changed based on behavior of one or more viewers. For example, a program analyzing video data from a camera associated with a user device playing media content selected based on a PQP for a viewer may detect that the viewer is frequently squinting when watching the media content. In response, the program may increase a sharpness of the media content. One or more quality parameters associated with sharpness in the PQP may be adjusted when additional analysis of the viewer by the program indicates that a frequency of squinting by the viewer stops or is significantly reduced in response to the increase in the sharpness.

In a particular embodiment, a method includes receiving, at a server computing device, a request to stream media content to a user device. The request is associated with data identifying a personal quality profile. The method includes retrieving, via the server computing device, the personal quality profile associated with the data. The personal quality profile indicates media quality preferences. The method includes determining, via a processor of the server computing device, a version of the media content to send to the user device based on the media quality preferences of the personal quality profile and based on a delivery bit rate. The method also includes sending the version from the server computing device to the user device in response to the request.

In a particular embodiment, a computer-readable storage device includes instructions executable by a processor to perform operations. The operations include sending a request from a user device to a server computing device to have media content streamed to the user device. The request includes data associated with a personal quality profile. The operations also include receiving, at the user device, a first version of the media content in response to the request. Content of a version of the media content available to the server computing device is changed to the first version based on the personal quality profile.

In a particular embodiment, a server includes a processor and memory accessible to the processor. The memory includes instructions executable by the processor to receive, from a user device, a request to stream media content to the user device. The request is associated with data identifying a personal quality profile. The memory includes instructions executable by the processor to retrieve the personal quality profile associated with the data. The personal quality profile indicates media quality preferences. The memory includes instructions executable by the processor to determine a version of the media content to send to the user device based on the media quality preferences of the personal quality profile and a delivery bit rate. The method also includes instructions executable by the processor to send the version to the user device in response to the request.

FIG. 1 is a block diagram of a particular embodiment of a system 100 to deliver media content to a user device based on a personal quality profile (PQP). The media content may include, but is not limited to, video content from a video service or service provider, television programming, media on-demand, pay per view programming, audio programming, other content, or combinations thereof that is streamed to the user device. The media content may be obtained by the user device from a content provider 102 via a server computing device 104. The server computing device 104 may be associated with a service that provides media content to users or the server computing device 104 may be associated with a service provider that provides one or more communication services to customers (e.g., an internet service provider that provides one or more of telecommunication services, data services, and television programming services).

The user device may be one of a plurality of user devices associated with a viewer. The plurality of user devices associated with the viewer may include, but is not limited to, one or more media devices 106 and coupled display devices 108, one or more computing systems 110, one or more portable computing devices 112 (e.g., laptop computers, tablet computers, computerized glasses, personal digital assistants, etc.), one or more mobile communication devices 114 (e.g., a mobile phone), other devices, or combinations thereof. The number and type of user devices associated with a particular viewer may vary. A media device 106 may be a set-top box device, game system, or another device able to send media content to the display device 108 and able to communicate via a network 116 (e.g., the internet, a private network, or both). The media device 106 may be an integral component of the display device 108 or a separate component.

One or more of the user devices 106-114 may receive streaming media content from the network 116 via customer premises equipment (CPE) 118. The CPE 118 may facilitate communications between the network 116 and each media device 106 coupled to the CPE 118. The CPE 118 may also facilitate communications to and from the network 116 and one or more user devices (e.g., user devices 110-114) coupled by a wireless connection or a wired connection to a local area network (LAN) 120 established by, or accessible to, the CPE 118. The CPE 118 may be an access point to the network 116. The CPE 118 may include a router, a wireless router, a local area network device, a modem (e.g., a digital subscriber line modem or a cable modem), a residential gateway, security features, another communication device, or combinations thereof. A user device of the user devices 106-114 (e.g., the portable computing device 112 and the mobile communication device 114) may be able to receive the streaming media content via a mobile communication network 122 and the network 116 when the user device is not in communication with the network 116 via the CPE 118 or another network access point.

Each of the user devices 106-114 may include a processor and a memory accessible to the processor. A particular processor may execute instructions stored in an associated memory to perform operations. The operations may include, but are not limited to, accessing the network 116, creating or modifying the PQP, facilitating creation or modification of the PQP, storing and retrieving the PQP, using the PQP to modify received media content, using the PQP to change display settings, using the PQP to change audio settings, identifying media content to be accessed, requesting delivery of media content at a particular quality based on the PQP, receiving a stream of the media content, and outputting the media content. Some user devices 106-114 may not include resources or sufficient processing power to perform all of the above-mentioned operations.

A particular user device of the user devices 106-114 may include an integrated camera system or an external camera system 124 that enables collection of data about a viewer or viewers of media content output by the particular user device to a display device coupled to the particular user device. The data may be analyzed by the processor to gather information during setup or modification of the PQP, to determine changes to one or more display device settings to accommodate ambient viewing conditions, to determine whether to change the PQP to alter a quality of received media content, or combinations thereof.

The system 100 may include a database 126. The database 126 may store PQPs 128 associated with viewers that use the server computing device 104 to stream media content having a quality based on an associated PQP. The PQPs 128 stored in the database 126 may be accessed by the server computing device 104 and by the user devices 106-114. Each PQP stored in the database 126 may include information indicating media quality preferences of a viewer or group of viewers. The information in a particular PQP may be used by the server computing device 104 to determine a version of media content to send to a particular user device that requested the media content. The information in the PQP may also be used by the particular user device to determine a version of the media content to be delivered or requested, to adjust display device settings, to adjust sound system settings, to change received media content to more closely conform to quality preferences identified in the PQP, or combinations thereof In other embodiments, a PQP may be stored in a memory of one or more user devices 106-114. The server computing device 104 may receive the PQP or portions of the PQP from a particular user device that requests media content.

The server computing device 104 may include a processor 130 and a memory 132 accessible to the processor 130. The memory 132 may store data including settings, media content, and other information. In some embodiments, the database 126 may be stored in a portion of the memory 132. The data may also include instructions executable by the processor 130 to perform operations. For purposes of description, instructions for the server computing device 104 are illustrated in FIG. 1 as organized in functional modules. For example, the memory 132 may include a PQP setup module 134 to create or modify PQPs and a version module 136 to determine a version of media content based on an associated PQP (i.e., the version of media content to be sent to a particular media device that requested the media content).

The PQP setup module 134 may be executed by the server computing device 104 when a request is received from a particular user device of the user devices 106-114 to establish a new PQP or to modify an existing PQP. When the request is to establish a new PQP, a question and answer session may be established with the particular user device to determine quality preferences, preferred display device settings, preferred audio settings, information about an associated viewer or viewers, other information, or combinations thereof.

The question and answer session may include an information gathering portion and a visual portion. Additionally, an integrated camera of the particular media device or the camera system 124 may provide session data pertaining to ambient viewing conditions, and data related to the viewer or viewers, to the server computing device 104. In the information gathering portion, information gathering questions from a question set may be presented to a viewer and the viewer may input replies to the information gathering questions. The information gathering questions may prompt for information about conditions applicable to the viewer or group of viewers (e.g., ocular conditions, hearing deficiencies, etc.).

The visual portion may present images and ask questions about the images to determine ocular conditions, visual preferences, or both. For example, a particular image may be presented to determine whether the viewer has trouble distinguishing between the colors red and green. If the response indicates the viewer has trouble distinguishing between red and green, a first media content item of a media content item pair with a natural scene portion including reds and greens may be shown. A second media content item of the media content item pair may be shown. The second media content item may show the same scene with reduced colors in the natural scene portion. The viewer may be asked if the viewer prefers the first media content item, the second media content item, or has no preference between the two media content items. A second media content item pair may then be presented to determine if the viewer prefers synthetic scenes to include enhanced colors for better perception.

The PQP setup module 134 may be executed by the processor 130 to use responses from the information gathering portion, responses from the visual portion, and received session data to create the PQP. The PQP may define quality preferences for the viewer or group of viewers that are used by the server computing device 104 to select a particular version of media content to send to a user device associated with the viewer or viewers.

When the request is to modify the existing PQP, the PQP setup module may modify the existing PQP when the request includes data identifying modifications to the existing PQP. When the request does not include the data identifying modifications, the PQP setup module may send the particular user device selectable options regarding how to modify the existing PQP. A first selectable option may be to modify the existing PQP via a question and answer session. A second selectable option may be to modify the existing PQP based on statements regarding the desired quality or existing quality. A third selectable option may be to adjust indicators associated with quality parameters. Other selectable options may also be presented including a selectable option to cancel the request. After a particular selectable option choice is received at the server computing device 104, the PQP setup module 134 may implement modification of the existing PQP according to the selected option.

The version module 136 may be executed by the processor 130 to select a version of media content to send to a particular user device that requests the media content. For example, a particular user device of the plurality of devices 106-114 may send a request for media content to the server computing device 104 via the network 116. The request may identify the media content or the request may include data identifying the PQP. The server computing device 104 and the particular user device may determine a delivery bit rate for streamed delivery of the media content to the particular user device. The delivery bit rate may be based on network conditions associated with the particular user device. The PQP may be a default PQP associated with the particular user device or the PQP may be a particular PQP selected by a viewer from a listing of PQPs associated with the particular device. Alternately, an integrated camera system of the particular user device or the camera system 124 coupled to the particular user device may analyze the viewer or a group of viewers and select a PQP from information in a memory of the particular user device that identifies various PQPs. For example, a processor of the particular user device may analyze video input to identify a single viewer wearing glasses. The processor may compare an image of the viewer with images associated with various PQPs to determine an appropriate PQP for the viewer. The processor may find a first image that includes the viewer without glasses and a second image of the viewer with glasses. The processor may select the PQP associated with the second image. The processor may use the default PQP or may retrieve the media content without influence of a PQP when at least one viewer is not recognized.

A particular user device may retrieve the PQP, and if needed, may implement changes to settings for a display device, sound system, or both, associated with the particular display device. For example, the particular user device may change one or more settings associated with the display device (e.g., contrast, brightness, etc.), may change one or more settings associated with the sound system (e.g., bass, treble, balance, etc.) may turn on closed-captioning display, may turn off closed captioning display, or combinations thereof.

The version module 136 may be executed by the processor 130 to retrieve a PQP based on the data identifying the PQP. The version module 136 may utilize the PQP to determine a version of the media content to send to the particular user device based on media quality preferences included in the PQP and based on the delivery bit rate. The version module 136 may stream the version, or may have the version streamed, to the particular user device. For example, the version may be selected to satisfy quality parameters of the PQP without the amount of data streamed per unit time exceeding the delivery bit rate. If the delivery bit rate is not high and the PQP indicates that a high spatial resolution is preferred, a spatial resolution that is below a highest available spatial resolution (e.g., a 720 p spatial resolution instead of a 1080 p spatial resolution) may be selected to accommodate the delivery bit rate for delivering the media content to the particular user device.

In some embodiments, the version may be a particular version that is available at the server computing device 104, or a version that is available from the content provider 102, without additional modification. The server computing device 104 may retrieve the version and stream the version to the particular user device.

In other embodiments, a first version of the media content that is available at the server computing device 104, or available from the content provider 102, may be changed to the version. Changes to the first version may include a change to temporal resolution, spatial resolution, display ratio, one or more colors associated with synthetic scenes, one or more colors associated with natural scenes, other aspects of the media content, or combinations thereof In some embodiments, application of the PQP may cause the first version to be changed to a monocular video bit stream (e.g., when the PQP is associated with a person that has a stereopsis deficit). In some embodiments, the first version may be changed to include closed captioning data based on transcription of an audio portion of the media content when the first version does not include closed captioning data and when the PQP indicates that media content should include closed captioning data (e.g., one or more viewers associated with the PQP are hard of hearing).

The server computing device 104 may change the first version to the version, or the server computing device 104 may send the first version to a proxy server that changes the first version to the version. If a proxy server is used, the proxy server may stream the version to the particular user device or the proxy server may send the version to the server computing device 104 and the server computing device 104 may stream the version to the particular user device.

The particular user device may receive a stream of the version and output the media content based on the received version. In an embodiment, the particular user device may analyze the version received to determine whether the version satisfies the PQP. When the version satisfies the PQP, the particular user device may output the version. When the version does not satisfy the PQP, the particular media device may change the version to a second version that more closely conforms to media quality preferences of the PQP. The particular user device may then output the second version. For example, additional sharpening may be applied by the particular user device to the version to create a second version when a delivery bandwidth is too low to create a sharpness that satisfies a minimum sharpness preference identified in the PQP. The second version may be output by the particular user device.

While the version is being streamed to the particular user device, the particular user device may send information regarding one or more changes to the PQP to the server computing device 104. The information may be based on user input or may be based on analysis of data associated with one or more viewers viewing the version. The data may be obtained from a camera system coupled to the particular user device (e.g., an integrated camera or the camera system 124). In response to the information, the server computing device 104 may update the PQP to an updated PQP. The server computing device 104 may determine a second version of the media content to send to the particular user device based on the delivery bit rate and the updated PQP. The server computing device 104 may stream the second version to the particular user device or have the second version streamed to the particular user device.

When the information is based on user input, the updated PQP may replace the PQP. When the information is based on analysis of data, one or more conditions may need to be met before the updated PQP replaces the PQP. For example, the viewer may be notified that one or more changes were made to the PQP and the viewer may be given the option to reject the updated PQP, save the updated PQP, or modify the updated PQP. The notification may be provided to the particular user device while the second version is being streamed to the particular user device or when playback of the media content is paused or stopped. Alternately, acceptance or rejection of the updated PQP may be based on analysis of second data associated with the one or more viewers viewing the second version.

While the version is being streamed to the particular user device, the particular user device may receive user input to change the PQP to a second PQP. For example, the viewer of the media content may input a user command to the media device 106 to change from a default PQP to a second PQP associated with a family group when one or more family members join the viewer in watching and listening to the media content. In response to the user input, the particular user device may send information identifying the second PQP to the server computing device 104. The server computing device 104 may retrieve the second PQP based on the data identifying the second PQP. The server computing device 104 may utilize the second PQP to determine a second version of the media content to send to the particular user device based on media quality preferences included in the second PQP and based on the delivery bit rate (e.g., the second version may be selected to satisfy quality preferences in the second PQP without an amount of data streamed per unit time exceeding the delivery bit rate). The server computing device 104 may stream the second version, or may have the second version streamed, to the particular user device.

Figure 2:
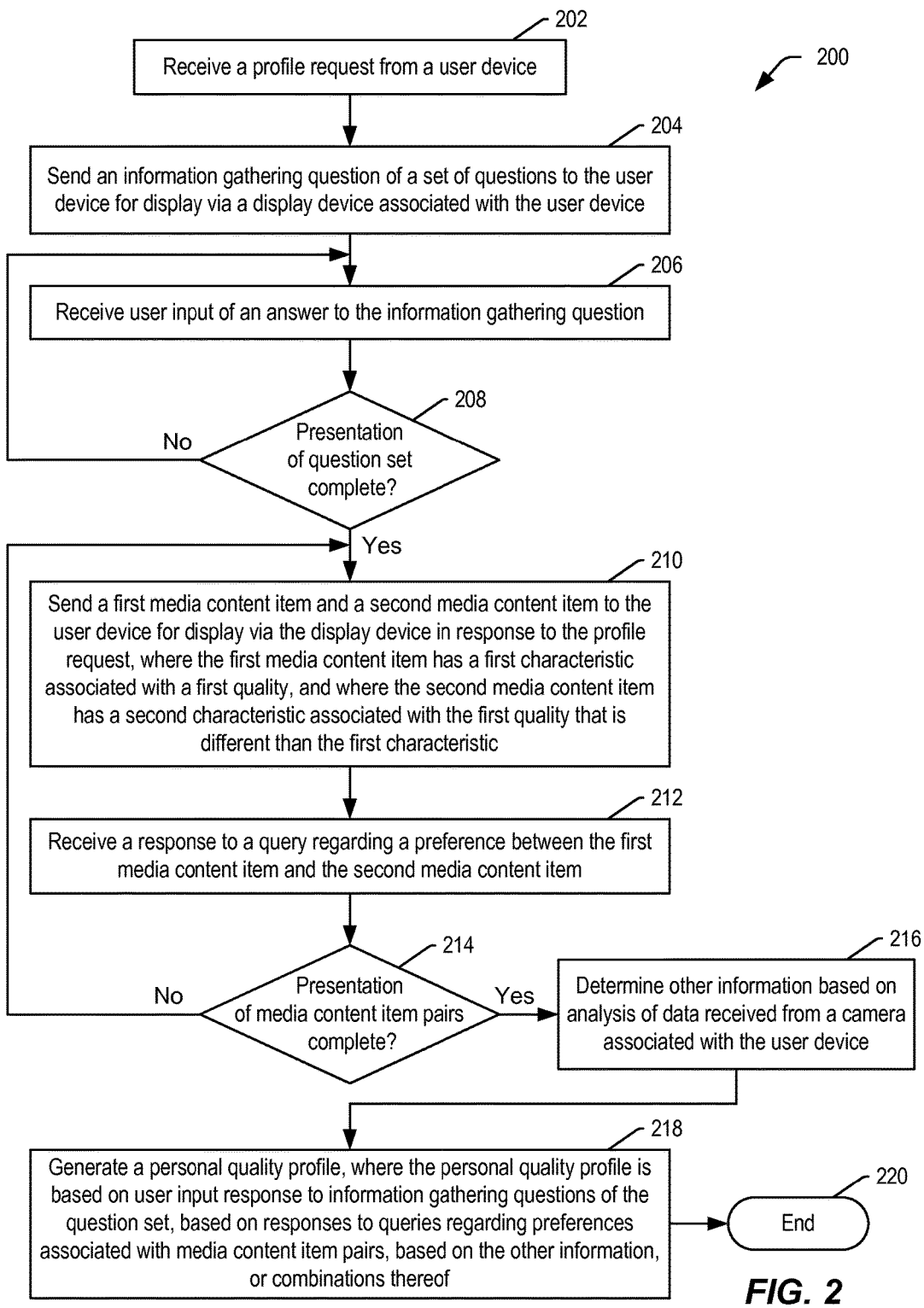
FIG. 2 is a flowchart of a particular embodiment of a method of generating a personal quality profile that may be used for delivery of media content to a user device at a particular quality based on the personal quality profile.

Referring to FIG. 2, a flowchart of a particular embodiment of a method 200 of generating a personal quality profile (PQP) that may be used for delivery of media content to a user device based on the PQP is shown. The method 200 may be performed by the server computing device 104 of FIG. 1. The user device may be one of the user devices 106-114 of FIG. 1. A profile request may be received from a media device, at 202. The request may be a request for a new PQP or a request to update an existing PQP.

When the request is a request for the new PQP, a question and answer session may be initiated. When the request is a request to update the existing PQP, options may be presented to a viewer about updating the PQP. A first option may be to initiate a question and answer session. A second option may be to enter user input of one or more statements regarding what feature or aspect is to be improved or what feature or aspect is lacking and have the server computing device adjust one or more parameters of the PQP in response to the one or more statements to more accurately reflect desires of the viewer about quality of received media content. A third option may be to provide input to adjust values of one or more quality parameters associated with the PQP. The input may be a numerical value associated with a quality parameter, an adjustment of a slide associated with a quality parameter, another type of adjustment, or combinations thereof. The method 200 describes generating the PQP based on a question and answer session. The question and answer session may include an information gathering portion and a visual portion.

During an information gathering portion, an information gathering question of a question set may be sent to the user device for display via a display device associated with the user device, at 204. User input of an answer to the information gathering question may be received, at 206. A particular answer may change information gathering questions in the set of questions. For example, if an answer to a first information gathering question about ocular conditions indicates that a viewer is colorblind, one or more additional questions may be added to the set of questions to determine a colorblindness type and severity, if such information is known by the viewer.

A determination may be made whether presentation of the question set is complete, at 208. When presentation is not complete, the method 200 may return to 204 to present another information gathering question from the question set to the user device for display via the display device. When the presentation is complete, the session may continue with the visual portion. In some embodiments, the visual portion of the session may include presenting queries regarding particular media content items. For example, a particular media content item may show a red number on a green background. A query may ask the viewer what number is shown in the media content item to determine if the viewer has protanopia (i.e., a type of red-green colorblindness). Such queries may determine if the viewer has particular types of colorblindness or other ocular conditions and may be presented in addition to, or in lieu of, learning of such conditions via the question set.

The visual portion may include displaying media content item pairs to the display device and receiving viewer input about a preference or lack of preference in response to each media content item pair. A first media content item and a second media content item may be sent to the user device for display via the display device in response to the profile request, at 210. The first media content item may have a first characteristic associated with a first quality and the second media content item may have a second characteristic associated with the first quality that is different than the first characteristic. For example, the first media content item may have a 50 frame per second temporal resolution of a particular scene and the second media content item may have a 24 frame per second temporal resolution of the particular scene.

A response to a query regarding a preference for the first media content item or the second media content item may be received, at 212. The query may ask a viewer whether the viewer wants to see a replay of one or both media content items of the media content item pair, whether the viewer prefers the first media content item, whether the viewer prefers the second media content item, whether the viewer had no preference, or combinations thereof.

In some embodiments, the first media content item and the second media content item may be the same for some media content item pairs. When the viewer enters a selection of a preference of the first media content item or the second content media content item when the media content items are the same, a counter may be increased and entry of at least one more identical media content item pair based on different media content may be scheduled. The counter may be compared to a threshold. Should the counter satisfy the threshold (e.g., equal the threshold), the viewer may be informed that a PQP cannot be generated for the viewer based on the responses. An offer to initiate another session may be presented to the viewer.

A determination may be made whether presentation of media content item pairs is complete, at 214. The presentation of media content pairs may be complete when sufficient information is obtained to determine temporal resolution preferences, spatial resolution preferences, one or more other quality preferences, or combinations thereof The other preferences may include, but are not limited to, a color preference for enhanced colors in synthetic scenes to increase perception of the synthetic scenes, an amount of color reduction in natural scenes for people not able to fully perceive natural scenes or to accommodate personal preferences, a brightness setting for ambient lighting conditions, a contrast setting for the ambient light conditions, other preferences, or combinations thereof When presentation of media content pairs is not complete, the method 200 may return to 210 for another media content item pair to be sent to the user device for display via the display device. When the presentation is complete, other information based on analysis of data received from a camera associated with the user device may be determined, at 216. The other information may include information about the viewer, information about viewing conditions (e.g., intensity of ambient light, location of the viewer relative to the display device, etc.), other information, or combinations thereof.

A PQP may be generated, at 218. The PQP may be generated based on user input of answers to information gathering questions, based on query responses to the visual portion of the question and answer session including responses to queries regarding preferences associated with media content item pairs, based on the other information, or based on combinations thereof. The PQP may enable the server computing device to select or generate a version of media content that satisfies one or more quality preferences identified in the PQP. The PQP may include XML data, tables, minimum acceptable quality parameters for quality preferences, maximum quality parameters for quality preferences, data for identifying one or more people, data to set settings of one or more display devices, data to set audio system settings for one or more audio systems, other information, or combinations thereof. The PQP may be stored in a database. The database may associate the PQP with the viewer so that the PQP may be used in association with one or more devices associated with the viewer. The method 200 may end at 220.

Figure 3:
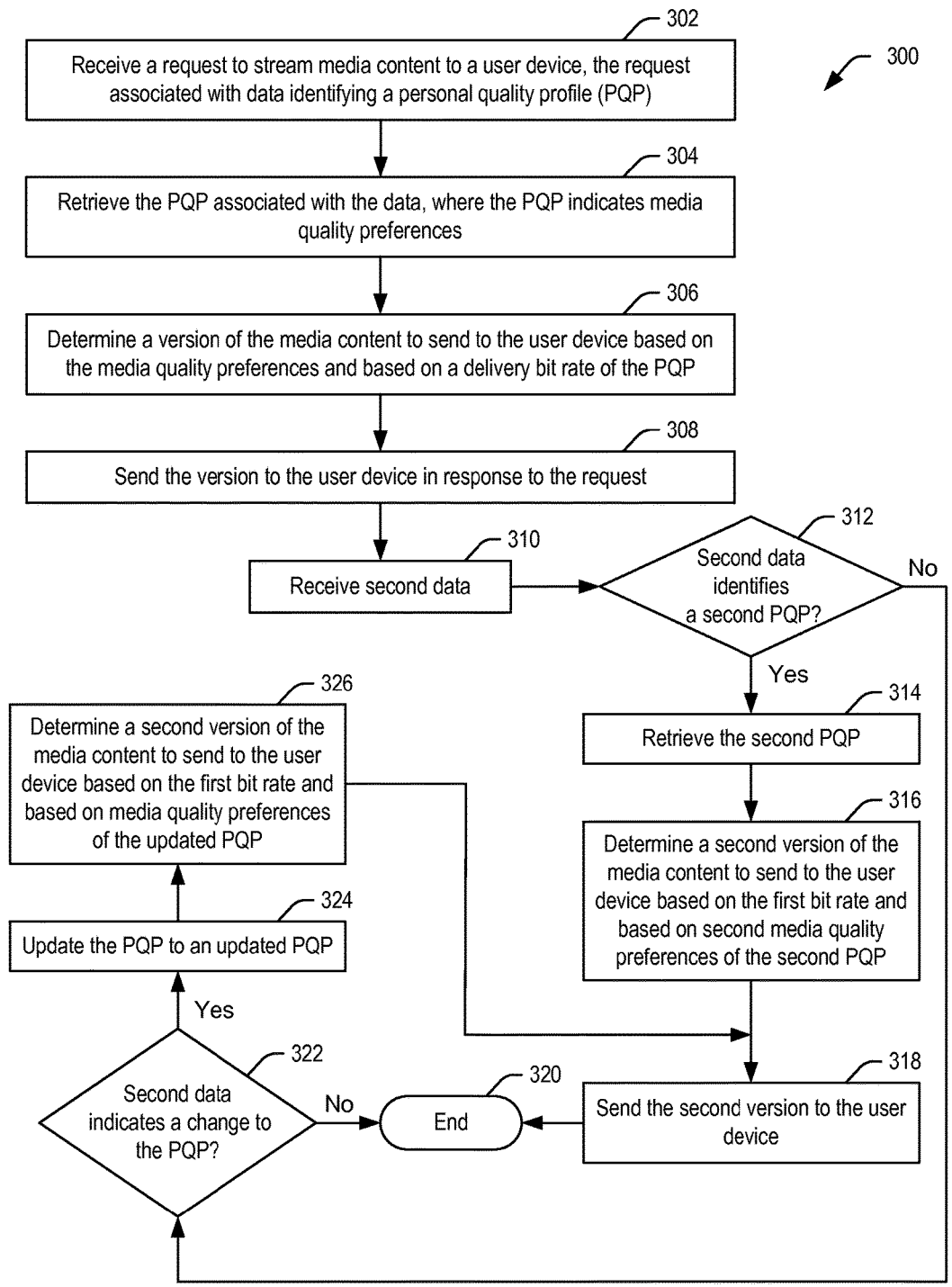
FIG. 3 is a flowchart of a first particular embodiment of a method to deliver media content to a user device at a particular quality based on a personal quality profile.

Referring to FIG. 3, a flowchart of a first particular embodiment of a method 300 to deliver media content to a user device based on a personal quality profile (PQP) is shown. The method 300 may be performed by the server computing device 104 of FIG. 1. The user device may be one of the user devices 106-114 of FIG. 1. A request to stream media content to the user device may be received, at 302. The request may include data identifying the PQP. The server computing device 104, customer premises equipment, the particular user device, or combinations thereof, may determine a delivery bit rate for delivery of the media content to the particular user device. The delivery bit rate may be based on network conditions associated with the particular user device.

The PQP associated with the data may be retrieved, at 304. The PQP may be associated with an individual or with a group of people (e.g., a family, a group of friends, etc.). The PQP may indicate media quality preferences for media content. The media quality preferences may include one or more visual preferences (e.g., minimum spatial resolution, a minimum temporal resolution, a desired balance of spatial resolution and temporal resolution of the media content), one or more audio preferences, or both.

A version of the media content to send to the user device may be determined based on the media quality preferences of the PQP and the delivery bit rate, at 306. The version may be changed to accommodate the delivery bit rate should the delivery bit rate change during delivery of the media content to the user device. For example, if the delivery bit rate increase, the increase may allow the version to be changed to a version with increased sharpness if the PQP indicates a preference for sharp media content. As another example, if the delivery bit rate decreases, the increase may result in the version being changed to another version that can be accommodated by the decreased delivery bit rate.

In some embodiments, the version may be a particular version of a plurality of versions of the media content available to the server computing device. In some embodiments, content of a particular version available to the server computing device is changed by the server computing device to accommodate a vision preference or characteristic of a viewer associated with the personal quality profile. For example, the server computing device may transcode a first version of a plurality of versions available to the server computing device to the version. The version may be sent to the user device in response to the request by the server computing device, at 308. In other embodiments, the server computing device may have a proxy server generate the version. The proxy server may send the version to the user device via the server computing device or the proxy server may send the version to the user device without sending the version to the server computing device.

Second data may be received by the server computing device, at 310. The second data may be associated with the request to stream media content to the user device. A determination may be made by the server computing device whether the second data identifies a second PQP, at 312. When the second data identifies a second PQP, the server computing device may retrieve the second PQP, at 314. The server computing device may determine a second version of the media content to send to the user device based on the delivery bit rate and based on second quality preferences of the second PQP, at 316. The server computing device may obtain or generate the second version. The server computing device may send the second version to the user device, at 318. The method 300 may then end, at 320.

When the second data does not identify a second PQP, at 312, the server computing device may determine if the second data indicates at least one change to the PQP, at 322. When the second data does not indicate at least one change to the PQP, the method 300 may end at 320.

When the second data does indicate at least one change to the PQP, at 322, the server computing device may update the PQP to an updated PQP, at 324. The server computing device may determine a second version of the media content to send to the user device based on the delivery bit rate and based on media quality preferences of the updated PQP, at 326. The server computing device may send the second version to the user device, at 318. The method 300 may then end, at 320.

Figure 4:
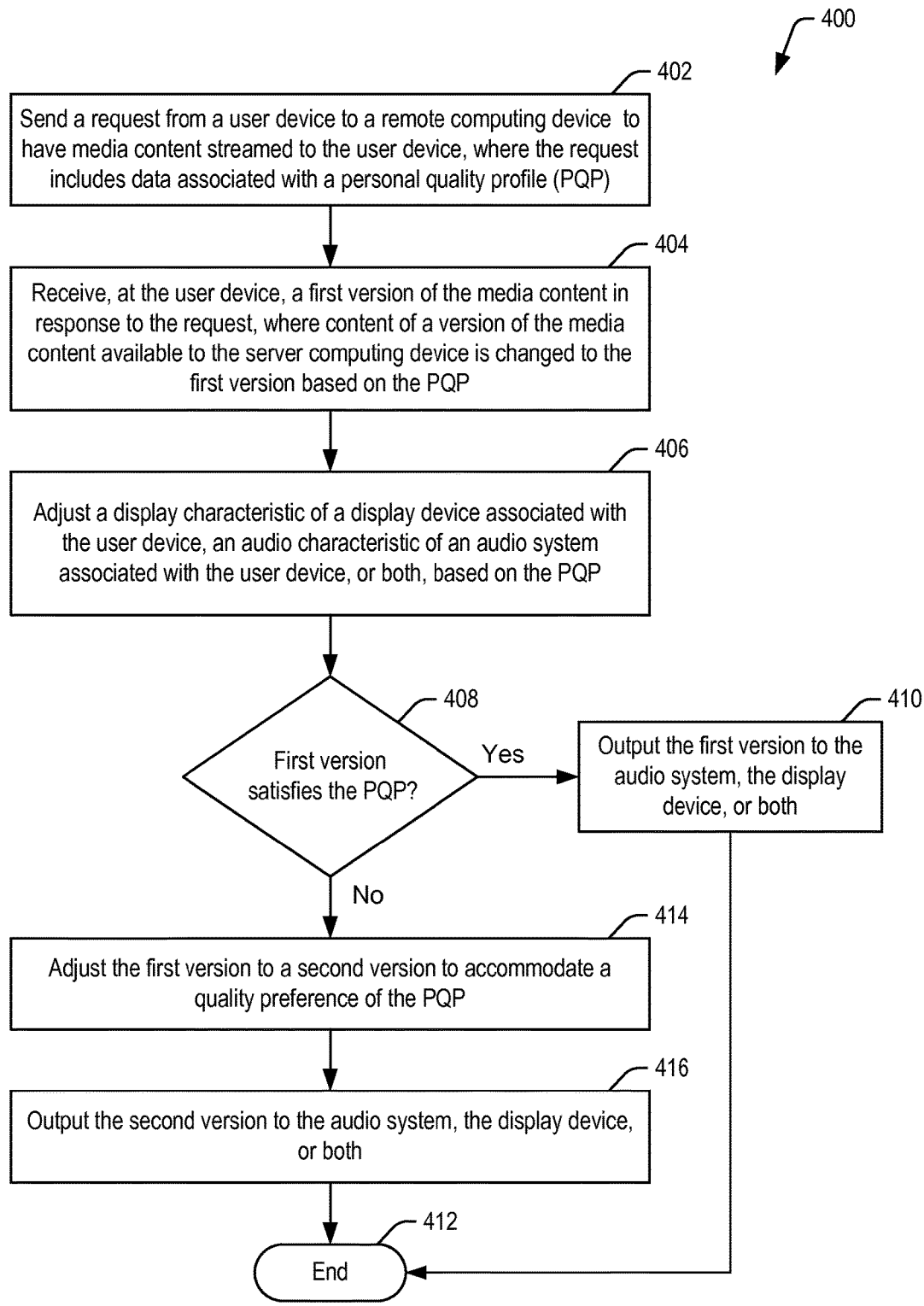
FIG. 4 is a flowchart of a second particular embodiment of a method to deliver media content to a user device at a particular quality based on a personal quality profile.

Referring to FIG. 4, a flowchart of a first particular embodiment of a method 400 to deliver media content to a user device at a particular quality based on a personal quality profile (PQP) is shown. The method 400 may be performed by one of the user devices 106-114 of FIG. 1. At 402, a request to have media content streamed to the user device may be sent from the user device to a remote computing device. The remote computing device may be a server computing device, a service provider device, a device associated with a content provider, another device, or combinations thereof The request may include data associated with the PQP. In an embodiment, the data enables the server computing device to retrieve the PQP from a database or from the user device. In another embodiment, the data is a portion of the PQP that enables the server computing device to determine a spatial resolution and a temporal resolution of a particular version of the media content to send to the user device.

A first version of the media content may be received at the user device in response to the request, at 404. Content of a version of the media content available to the server computing device may be changed to the first version based on the PQP.

The user device may adjust one or more display characteristics of a display device associated with the user device, one or more audio characteristics of an audio system associated with the user device, or both, based on the PQP, at 406. The display characteristics may include brightness, contrast, color palette, vertical position, horizontal position, other display adjustment, or combinations thereof The audio characteristics may include balance of sound provided to various speakers of a speaker system, bass control, treble control, volume control, other audio adjustment, or combinations thereof.

The adjustments may be based on analysis of video data from a camera coupled to the user device. For example, the analysis of data from the camera may detect ambient lighting conditions and adjust contrast, brightness, or both based on the ambient lighting conditions. As another example, the analysis of data from the camera may detect a position of a first person associated with a group personal quality profile that is hard of hearing based on one or more identifying characteristics of the first person described in the PQP. Balance of sound among speakers of a speaker system may be adjusted to direct extra sound to the first person with little or no impact to other members of the group.

A determination may be made by a processor of the user device whether the first version satisfies the PQP considering capabilities of the user device, at 408. For example, in a particular embodiment, the first version may have a particular spatial resolution and a particular temporal resolution, but may not be adjusted to compensate for color blindness or other ocular condition. The determination may indicate that the first version does not satisfy the PQP. As another example, in a particular embodiment, the first version may have a particular spatial resolution and a particular temporal resolution that satisfies the quality preferences indicated in the PQP. The determination may indicate that the first version satisfies the PQP.

When the determination indicates that the first version satisfies the PQP, at 408, the first version may be output to the audio system, the display device, or both, at 410. The method 400 may end at 412.

When the determination indicates that the first version does not satisfy the PQP, at 408, the first version may be changed to a second version by the user device to accommodate quality preferences of the PQP, at 414. The second version may be output to the audio system, the display device, or both, at 416. For example, when the bandwidth used to deliver the first version to the user device is low, a sharpness of the first version may not be sufficient to satisfy the PQP (e.g., a minimum spatial resolution). The user device may change the first version to a second version that provides additional sharpness. The second version may be sent to an audio system and display device associated with the user device. The method 400 may end at 412.

Various embodiments disclosed herein describe personal quality profiles for viewers or groups of viewers. The personal quality profiles may be utilized to deliver versions of media content to user devices with viewer selected quality characteristics. The versions delivered to the user devices may enhance viewing experiences of viewers, reduce bandwidth needed to deliver the versions as compared to delivery of versions not modified to account for viewer selected quality characteristics, or both.

Figure 5:
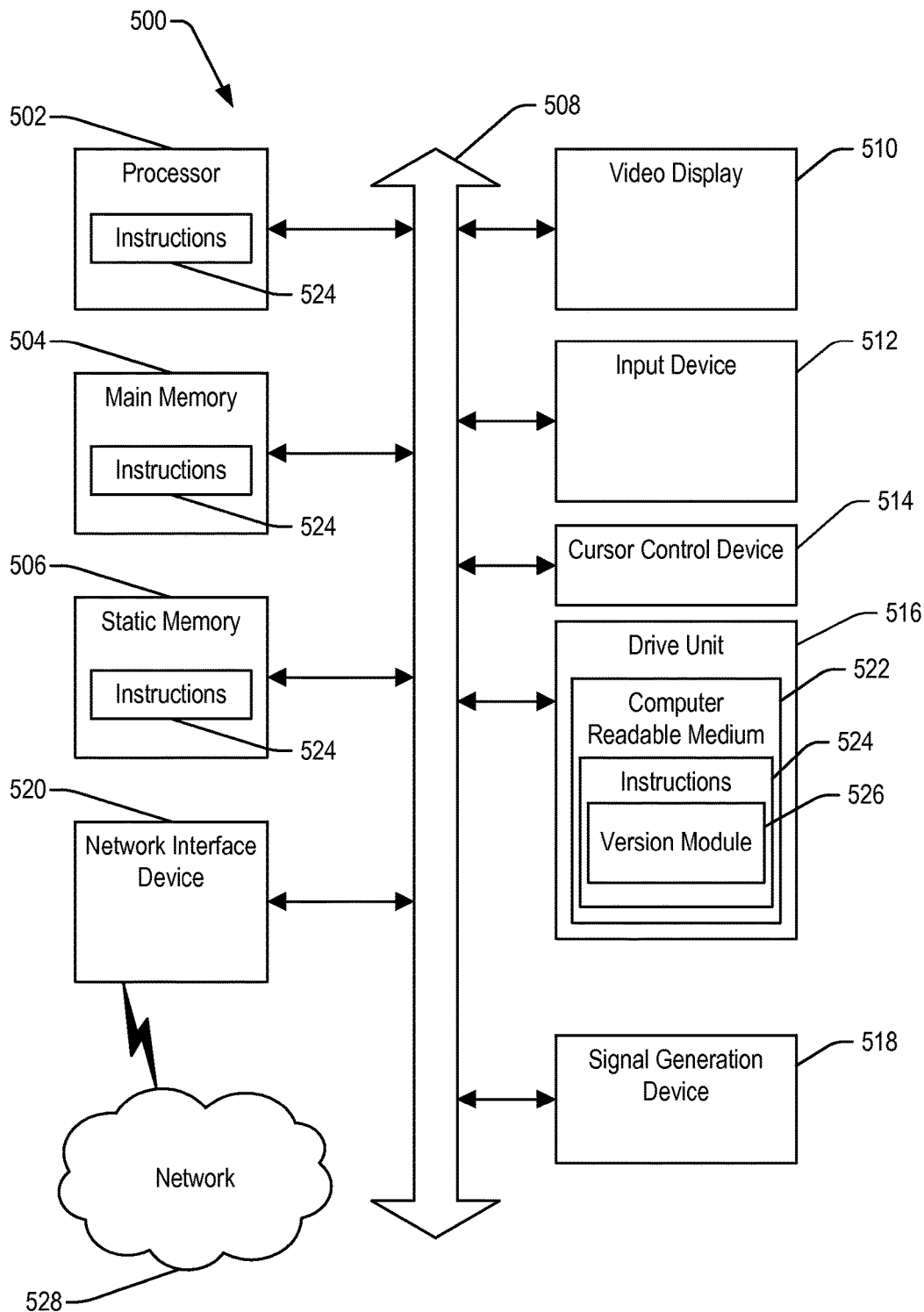
FIG. 5 is a block diagram of an illustrative embodiment of a general computer system.

Referring to FIG. 5, an illustrative embodiment of a general computer system is shown and is designated 500. The computer system 500 includes a set of instructions that can be executed to cause the computer system 500 to perform any one or more of the methods or computer based functions disclosed herein. The computer system 500 may operate as a standalone device or may be connected, e.g., using a network, to other computer systems or peripheral devices. For example, the computer system 500 may include or be included within any one or more of the content provider 102, the server computing device 104, the media device 106, the display device 108, the computing system 110, the portable computing device 112, the mobile communication device 114, the database 126, or combinations thereof described with reference to FIG. 1.

In a networked deployment, the computer system 500 may operate in the capacity of a server or as a client user computer in a server-client user network environment, or as a peer computer system in a peer-to-peer (or distributed) network environment. The computer system 500 may also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a web appliance, or any other machine capable of executing a set of instructions (sequential or otherwise) that specify actions to be taken by that machine. In a particular embodiment, the computer system 500 may be implemented using electronic devices that provide video, audio, or data communication. Further, while a single computer system 500 is illustrated, the term "system" shall also be taken to include any collection of systems or sub-systems that individually or jointly execute a set, or multiple sets, of instructions to perform one or more computer functions.

As illustrated in FIG. 5, the computer system 500 may include a processor 502, e.g., a central processing unit (CPU), a graphics processing unit (GPU), or both. Moreover, the computer system 500 may include a main memory 504 and a static memory 505, which can communicate with each other via a bus 508. As shown, the computer system 500 may further include a video display unit 510, such as a liquid crystal display (LCD), a flat panel display, a solid state display, or a lamp assembly of a projection system. Additionally, the computer system 500 may include an input device 512, such as a keyboard, and a cursor control device 514, such as a mouse. The computer system 500 may also include a drive unit 515, a signal generation device 518, such as a speaker or remote control, and a network interface device 520. Some computer systems 500 may not include an input device (e.g., a server may not include an input device).

In a particular embodiment, as depicted in FIG. 5, the drive unit 515 may include a computer-readable storage device 522 in which one or more sets of instructions 524, e.g. software, can be embedded. As used herein the term "computer-readable storage device" refers to an article at manufacture and excludes signals per se. Further, the instructions 524 may embody one or more of the methods or logic as described herein. In a particular embodiment, the instructions 524 may reside completely, or at least partially, within the main memory 504, the static memory 505, and/or within the processor 502 during execution by the computer system 500. The main memory 504 and the processor 502 also may include computer-readable storage devices. The instructions 524 in the drive unit 515, the main memory 504, the static memory 505, the processor 502, or combinations thereof may include a version module 526 that determines what version of media content based on a personal quality profile and a delivery bit rate to send to a user device that requests the media content.

In an alternative embodiment, dedicated hardware implementations, such as application specific integrated circuits, programmable logic arrays and other hardware devices, may be constructed to implement one or more of the methods described herein. Applications that may include the apparatus and systems of various embodiments may broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limiting embodiment, implementations may include distributed processing, component/object distributed processing, and parallel processing. Alternatively, virtual computer system processing may be constructed to implement one or more of the methods or functionality as described herein.

The present disclosure includes a computer-readable storage device 522 that stores instructions 524 or receives, stores and executes instructions 524, so that a device connected to a network 528 may communicate voice, video or data over the network 528. While the computer-readable storage device is shown to be a single device, the term "computer-readable storage device" includes a single device or multiple devices, such as a centralized or distributed database, and/or associated caches and servers that store one or more sets of instructions. The term "computer-readable storage device" shall also include any device that is capable of storing a set of instructions for execution by a processor or that cause a computer system to perform any one or more of the methods or operations disclosed herein.

In a particular non-limiting, exemplary embodiment, the computer-readable storage device can include a solid-state memory such as a memory card or other package that houses one or more non-volatile read-only memories. Further, the computer-readable storage device can be a random access memory or other volatile re-writable memory. Additionally, the computer-readable storage device can include a magneto-optical or optical medium, such as a disk or tapes or other storage device. Accordingly, the disclosure is considered to include any one or more of a computer-readable storage device and successor devices, in which data or instructions may be stored.

It should also be noted that software that implements the disclosed methods may optionally be stored on a computer-readable storage device, such as: a magnetic medium, such as a disk or tape; a magneto-optical or optical medium, such as a disk; or a solid state medium, such as a memory card or other package that houses one or more read-only (non-volatile) memories, random access memories, or other re-writable (volatile) memories.

Although the present specification describes components and functions that may be implemented in particular embodiments with reference to particular standards and protocols, the disclosed embodiments are not limited to such standards and protocols. Such standards are periodically superseded by faster or more efficient equivalents having essentially the same functions. Accordingly, replacement standards and protocols having the same or similar functions as those disclosed herein are considered equivalents thereof.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Accordingly, the disclosure and the figures are to be regarded as illustrative rather than restrictive.

Although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments.

The Abstract of the Disclosure is provided with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above-disclosed subject matter is to be considered illustrative, and not restrictive, and the appended claims are intended to cover all such modifications, enhancements, and other embodiments, which fall within the scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method comprising:
   receiving, at a server computing device, a request to stream media content to a user device, the request including a media content identifier associated with the media content, and the request associated with data identifying a personal quality profile;
   retrieving, at the server computing device, the personal quality profile identified by the data, wherein the personal quality profile indicates media quality preferences;
   identifying, via a processor of the server computing device, a version of the media content to send to the user device based on the media quality preferences and based on a delivery bit rate, wherein the version is identified based on a particular coloration attribute, a particular display ratio attribute, a particular spatial resolution attribute, a particular temporal resolution attribute, a particular monocular attribute or a combination thereof indicated by the media quality preferences;
   determining, at the server computing device, whether the version is available to the server computing device from a content source;
   in response to a determination of unavailability of the version, generating the version at the server computing device by:
      retrieving, at the server computing device, a particular version of the media content available to the server computing device from the content source based on the media content identifier; and
      modifying, at the server computing device, a particular attribute of the particular version that is retrieved to generate the version, wherein the particular attribute is based on the media quality preferences and is based on the delivery bit rate; and
   sending the version from the server computing device to the user device in response to the request.

2. The method of claim 1, further comprising:
   receiving second data from the user device, wherein the second data identifies a second personal quality profile;
   retrieving the second personal quality profile;
   determining a second version of the media content to send to the user device based on second media quality preferences of the second personal quality profile and based on the delivery bit rate; and
   sending the second version to the user device.

3. The method of claim 1, further comprising:
receiving second data, wherein the second data indicates a change to the personal quality profile;
updating the personal quality profile to an updated personal quality profile based on the second data;
determining a second version of the media content to send to the user device based on media quality preferences of the updated personal quality profile and based on the delivery bit rate; and
sending the second version to the user device.

4. The method of claim 1, further comprising:
receiving a profile request from the user device:
sending a first media content item and a second media content item to the user device for display via a display device associated with the user device in response to the profile request, wherein the first media content item includes a first depiction of a scene, wherein the first depiction has a first characteristic associated with a first quality, wherein the second media content item includes a second depiction of the scene, and wherein the second depiction has a second characteristic different than the first characteristic associated with the first quality;
receiving a response to a query regarding a preference between the first media content item and the second media content item; and
generating the personal quality profile based on the response, wherein the personal quality profile includes a first media quality preference of the media quality preferences for the first quality, the first media quality preference based on the response.

5. The method of claim 1, wherein modifying the particular attribute of the particular version comprises:
sending the particular version to a proxy server; and
receiving the version from the proxy server.

6. The method of claim 1, wherein modifying the particular attribute includes changing a coloration of the particular version to generate the version.

7. The method of claim 1, wherein modifying the particular attribute includes changing a display ratio of the particular version to generate the version.

8. The method of claim 1, wherein the particular version does not include closed captioning data, wherein the version includes closed captioning data, and wherein modifying the particular attribute includes:
generating the closed captioning data based on a transcription of audio data of the particular version; and
generating the version by adding the closed captioning data to the particular version.

9. The method of claim 1, wherein modifying the particular attribute of the particular version includes changing a spatial resolution of the particular version.

10. A server comprising:
a processor, and
a memory accessible to the processor, the memory comprising instructions executable by the processor to perform operations, the operations including:
receiving, from a user device, a request to stream media content to the user device, the request including a media content identifier associated with the media content, and the request associated with data identifying a personal quality profile;
retrieving the personal quality profile that indicates media quality preferences;
identifying a version of the media content to send to the user device based on the media quality preferences and a delivery bit rate, wherein the version is identified based on a particular coloration attribute, a particular display ratio attribute, a particular spatial resolution attribute, a particular temporal resolution attribute, a particular monocular attribute or a combination thereof indicated by the media quality preferences;
determining whether the version is available from a content source;
in response to a determination of unavailability of the version, generating the version by:
retrieving a particular version of the media content available from the content source based on the media content identifier; and
modifying a particular attribute of the particular version that is retrieved to generate the version, wherein the particular attribute is based on the media quality preferences and is based on the delivery bit rate; and
sending the version to the user device in response to the request.

11. The server of claim 10, wherein content of the version is changed to compensate for a visual deficit of a viewer associated with the personal quality profile.

12. A computer-readable storage device comprising instructions executable by a processor to perform operations, the operations including:
receiving a request to stream media content to a user device, the request including a media content identifier associated with the media content, and the request associated with data identifying a personal quality profile;
retrieving the personal quality profile, wherein the personal quality profile indicates media quality preferences;
identifying a version of the media content to send to the user device based on the media quality preferences and based on a delivery bit rate, wherein the version is identified based on a particular coloration attribute, a particular display ratio attribute, a particular spatial resolution attribute, a particular temporal resolution attribute, a particular monocular attribute or a combination thereof indicated by the media quality preferences;
determining whether the version is available to the processor from a content source;
in response to a determination of unavailability of the version, generating the version by:
retrieving a particular version of the media content available to the processor from the content source based on the media content identifier; and
modifying a particular attribute of the particular version that is retrieved to generate the version, wherein the particular attribute is based on the media quality preferences and is based on the delivery bit rate; and
sending the version to the user device in response to the request.

13. The computer-readable storage device of claim 12, wherein the operations further include:
receiving second data from the user device, wherein the second data identifies a second personal quality profile;
retrieving the second personal quality profile;
determining a second version of the media content to send to the user device based on second media quality preferences of the second personal quality profile and based on the delivery bit rate; and
sending the second version to the user device.

14. The computer-readable storage device of claim 12, wherein the operations further include:
  receiving second data, wherein the second data indicates a change to the personal quality profile;
  updating the personal quality profile to an updated personal quality profile based on the second data;
  determining a second version of the media content to send to the user device based on media quality preferences of the updated personal quality profile and based on the delivery bit rate; and
  sending the second version to the user device.

15. The computer-readable storage device of claim 12, wherein the operations further include:
  receiving a profile request from the user device:
  sending a first media content item and a second media content item to the user device for display via a display device associated with the user device in response to the profile request, wherein the first media content item has a first characteristic associated with a first quality, and wherein the second media content item has a second characteristic different than the first characteristic associated with the first quality; and
  receiving a response to a query regarding a preference between the first media content item and the second media content item; and
  generating a first media quality preference of the media quality preferences in the personal quality profile for the first quality based on the response.

16. The computer-readable storage device of claim 12, wherein modifying the particular attribute of the particular version comprises:
  sending the particular version to a proxy server; and
  receiving the version from the proxy server.

17. The computer-readable storage device of claim 12, wherein the personal quality profile is associated with a plurality of people.

18. The computer-readable storage device of claim 12, wherein the operations further include, in response to availability of the version, retrieving the version.

19. The computer-readable storage device of claim 12, wherein modifying the particular attribute includes changing a temporal resolution of the particular version to generate the version.

20. The computer-readable storage device of claim 12, wherein modifying the particular attribute of the particular version comprises changing a non-monocular attribute to a monocular attribute.

\* \* \* \* \*